July 13, 1926.
L. G. BLUME
1,592,072
PUBLICLY VISIBLE SPEED INDICATOR
Filed March 18, 1926
Fig.1
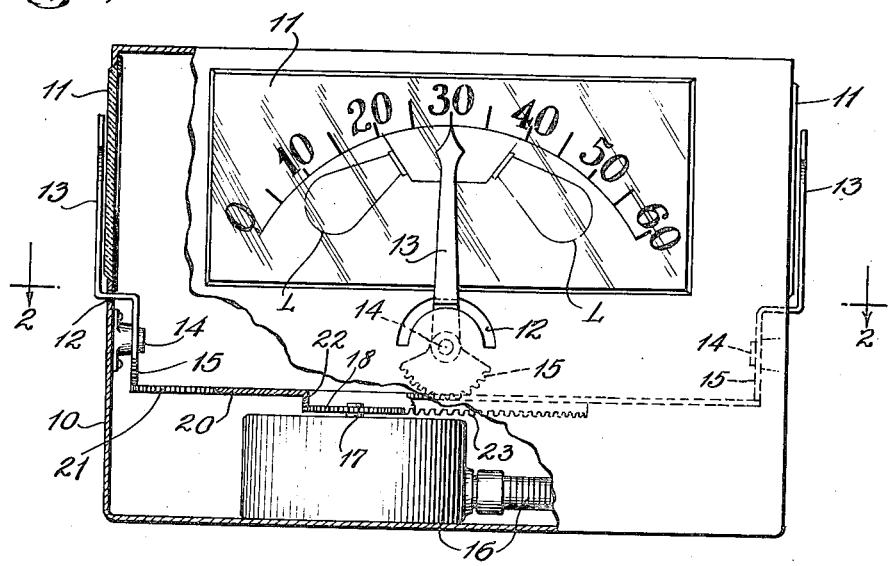
Fig.2
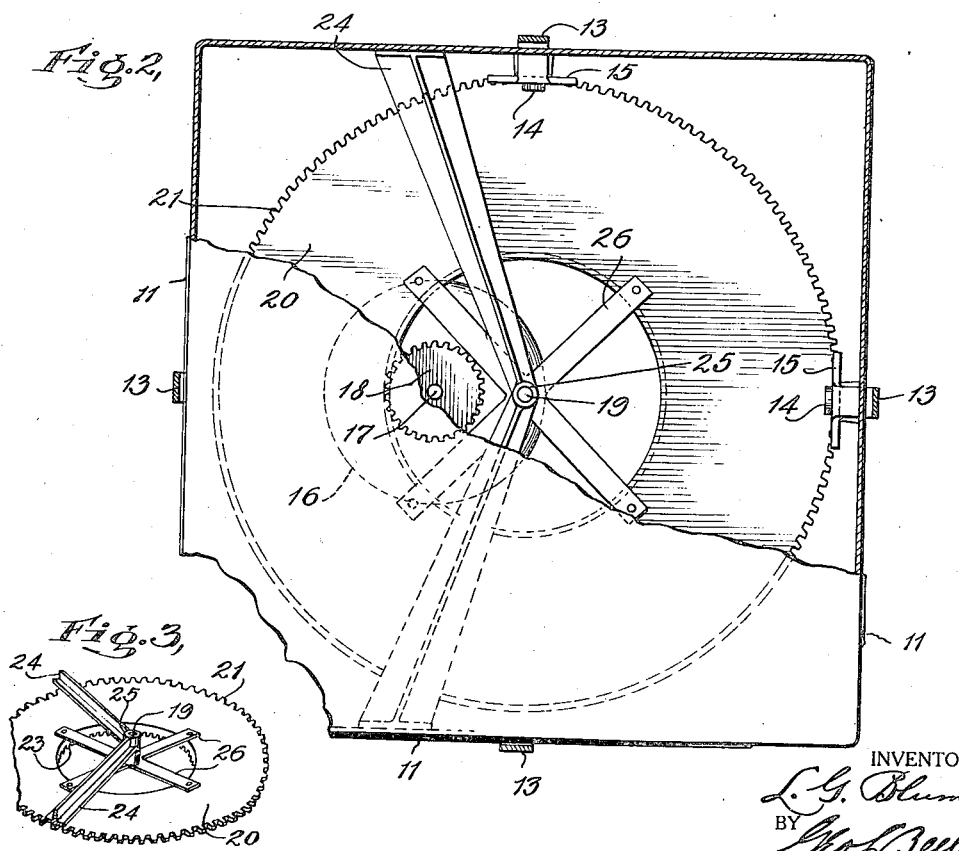
Fig.3
INVENTOR
L. G. Blume
BY Geo. H. Beeler
ATTORNEY Patented July 13, 1926.

1,592,072

UNITED STATES PATENT OFFICE.

LOUIS G. BLUME, OF NEW YORK, N. Y.

PUBLICLY-VISIBLE SPEED INDICATOR.

Application filed March 18, 1926. Serial No. 95,601.

This invention relates to speed indicators and has particular reference to that class of devices adapted especially for motor vehicles.

In the now prevalent practice of automobiling or the operation of similar machines, it is well known that for the safety of the public the authorities are compelled to establish in most jurisdictions and on nearly all highways maximum speed limits. It is also well known that for many reasons or excuses such maximum speed limits are frequently exceeded and the laws and regulations violated with result that many fatalities occur and other disasters are caused. Moreover, it is difficult at most times to detect or apprehend the violators of such regulations for the simple reason that the authorities are unable to observe the speeds at which the machines are operated unless the officers are equipped with rapid machines and are able to follow or run down the offenders.

Among the objects of the invention, therefore, is to provide for every road machine an indicator mechanism so constructed and designed as to show plainly in various directions or on both sides as well as in front thereof, the speed at which it is operated, whereby a traffic officer even though standing at his place of duty may observe the speed and either apprehend the offender immediately or report him through his license number which is required to be visible at all times.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a side elevation partly in section showing the upper parts of a preferred embodiment of the invention.

Fig. 2 is a plan view partly in section of the same mechanism.

Fig. 3 is a fragmentary detail view of the bearing support for the master gear within the casing.

Referring now more specifically to the drawings I show my improvement as comprising a casing 10 of rectangular form, square in plan, the same being adapted to be supported in any convenient and conspicuous place upon the machine, for instance, upon the hood of the engine or in front of the dash board, being provided with four similarly shaped sides, each fitted with an indicator plate 11 made of glass or some other suitable material of transparent or translucent nature. It is expedient for the four sides to thus be so equipped that any one in front of the machine or at either side may observe the speed at which the machine is operated as well as the driver himself. The plates 11 are each provided with a series of indicia such as numerals corresponding to various rates of speed within reasonable limits from zero up to the maximum representing miles per hour as is the usual practice in this country in automobile speedometers.

Below each plate 11 the side wall is formed with an arc shaped slot 12, the center of curvature of which coincides with that of the series of numerical indicia on the plate above.

Co-operating with each plate 12 and adapted to indicate the speed of the vehicle by reference to the numerical indicia is a pointer 13 shown as projecting laterally through the slot 12 and then bent upward so as to sweep over the plate for the purpose indicated. Each pointer 13 is pivoted at a horizontal pivot 14 whose axis coincides with the center of curvature just referred to, and at its lower end the pointer arm is provided with a gear segment 15 likewise concentric with the axis of the pointer. These pointer mechanisms as well as the several plates and indicia are precisely the same on all four sides of the casing and the indication is identical on all plates simultaneously.

At 16 I indicate conventionally any suitable or well known speedometer mechanism, the same being constructed to include a vertical shaft 17 which is caused in accordance with the usual practice of speedometers to vibrate or oscillate around its axis in accordance with variations in rates of speed of the vehicle to which the mechanism is attached. Secured to the upper end of the shaft 17 is a gear pinion 18.

Journaled upon a vertical central axis 19 in the casing is a master gear 20, formed preferably as a stamping from sheet metal or its equivalent and having at its periphery a series of teeth 21 meshing with the respective gear segments 15 of the pointer arms. The gear 20 is formed with an open center bounded by a downwardly projected flange 22 having at its lower edge a series of gear teeth 23 meshing constantly with the pinion 18 of the speedometer or actuator 16. The pinion 18 is smaller than the gear flange 22 and consequently the shaft 17 of the actuator is eccentric to the master gear.

The operation will be readily understood from the foregoing description of the mechanism which being of a relatively simple nature as to construction, may be made and put on the market at a relatively low cost. The actuator being suitably connected to the running gear of the machine as has been done heretofore, the pinion 18 as to its rotation or oscillation will be directly subject to the variation in speed at which the machine is operated, and consequently as the pinion 18 rotates or oscillates the master gear 20 will be oscillated in a similar direction but at a lower angular speed because of the disparity in diameters of the pinion and gear. With the movement of the master gear all the gear segments 15 and pointer arms will be operated in a similar direction with respect to the several indicator plates over or along which they operate. Naturally with every variation in speed of the machine, the several pointers will indicate corresponding variations along their index plates. Any suitable numerical arrangement may be availed of as to the indicia, but it is preferable that the numerical maximum speed allowed by law be located or indicated at the mid position of the plate or with the pointer vertical. Consequently any observer can determine at a glance even though the numbers may not be legible whether the maximum speed is exceeded or not. For night service any suitable illuminating means such as one or more lamps L may be mounted within the casing so that the numbers on the plates will be visible, and the location of the pointers likewise will be visible.

The means for supporting the master gear 20 includes a bracket 24 having one or more arms secured on the inner surfaces of the casing preferably on opposite sides, the same being provided with a hub 25 in which the axis 19 of the master gear is journaled, said hub or bearing having sufficient height to insure proper stability of the gear. The spindle 19 is connected to the gear by means of a spider 26 spanning the large central opening of the master gear and adapted to sweep freely over the pinion 18 and its shaft.

I claim:

1. The herein described speed indicator comprising, in combination, a casing having upwardly extending walls, a plurality of index plates secured to said walls, each plate bearing in plainly visible characters indicia to indicate rates of speed and all the plates being similarly indicated, a master wheel journaled within the casing on a vertical axis, a speed-controlled actuator within the casing and co-operating with the master wheel to oscillate the same around its axis according to variations in speed of the actuator, and a plurality of spaced pointers, one for each index plate, journaled on horizontal axes on said casing walls and co-operating with the master wheel to cause simultaneously the speed of the actuator to be indicated at all the plates.

2. In a speed indicator as set forth, the combinaion of a casing having a plurality of similarly constructed index plates arranged in vertical planes in its side walls, each plate having speed indicating indicia visible by day or by night, the casing being provided with an arc shaped slot beneath each plate, a speed indicating pointer journaled within the casing and projected through the slot incident to each plate, the axis of the pointer being coincident with the curvature of the slot and the numerical indicia of the plate. and the lower inner end of the pointer arm being provided with gear teeth likewise concentric with the pivot thereof, a speed actuator within the casing, a master gear journaled on a vertical axis centrally within the casing and having peripheral teeth meshing constantly with the gear teeth of the several pointers, the central portion of the gear wheel being provided with a downwardly projecting flange having a series of gear teeth formed thereon beneath the plane of the main portion of the wheel, and a pinion actuated by the actuator and meshing constantly with the flange teeth, whereby the variations in speed of the machine are indicated at the several plates.

3. Mechanism as set forth in claim 2 characterized by the provision of a journaled support for the master wheel secured within the casing above the main plate thereof comprising means spanning the central portion of said gear wheel.

In testimony whereof I affix my signature.

LOUIS G. BLUME.